(12) United States Patent
Todoroki et al.

(10) Patent No.: US 7,853,743 B2
(45) Date of Patent: Dec. 14, 2010

(54) PROCESSOR AND INTERRUPT CONTROLLING METHOD

(75) Inventors: Akinari Todoroki, Okaya (JP); Katsuya Tanaka, Sapporo (JP); Hiroaki Takada, Nagoya (JP); Shinya Honda, Aichi-gun (JP)

(73) Assignees: Seiko Epson Corporation, Tokyo (JP); National University Corporation, Nagoya-shi (JP)

( * ) Notice: Subject to any disclaimer, the term of this patent is extended or adjusted under 35 U.S.C. 154(b) by 91 days.

(21) Appl. No.: 11/979,341

(22) Filed: Nov. 1, 2007

(65) Prior Publication Data

US 2008/0140896 A1 Jun. 12, 2008

(30) Foreign Application Priority Data

Nov. 10, 2006 (JP) ............................. 2006-304798

(51) Int. Cl.
G06F 13/00 (2006.01)
G06F 13/26 (2006.01)

(52) U.S. Cl. ........................ 710/260; 710/264; 710/267

(58) Field of Classification Search .......... 710/260–269
See application file for complete search history.

(56) References Cited

U.S. PATENT DOCUMENTS

| | | | | | |
|---|---|---|---|---|---|
| 3,895,353 | A | * | 7/1975 | Dalton | 710/263 |
| 5,012,409 | A | * | 4/1991 | Fletcher et al. | 718/103 |
| 5,452,452 | A | * | 9/1995 | Gaetner et al. | 718/103 |
| 5,892,956 | A | * | 4/1999 | Qureshi et al. | 710/260 |
| 6,418,496 | B2 | * | 7/2002 | Pawlowski et al. | 710/264 |
| 7,178,145 | B2 | * | 2/2007 | Bono | 718/100 |
| 7,350,006 | B2 | * | 3/2008 | Yasue et al. | 710/264 |
| 7,426,728 | B2 | * | 9/2008 | Ruemmler et al. | 718/100 |
| 2001/0005880 | A1 | * | 6/2001 | Ando | 712/34 |
| 2002/0004966 | A1 | * | 1/2002 | Wakat et al. | 15/257.06 |
| 2005/0223302 | A1 | * | 10/2005 | Bono | 714/55 |
| 2006/0174246 | A1 | | 8/2006 | Tamura et al. | |
| 2006/0200826 | A1 | | 9/2006 | Tamura et al. | |

FOREIGN PATENT DOCUMENTS

| | | |
|---|---|---|
| EP | 1 686 474 A2 | 8/2006 |
| EP | 1 698 972 A2 | 9/2006 |
| GB | 2 277 388 A | 10/1994 |

(Continued)

*Primary Examiner*—Paul R Myers
*Assistant Examiner*—Trisha Vu
(74) *Attorney, Agent, or Firm*—Oliff & Berridge, PLC

(57) ABSTRACT

A processor includes: a plurality of processors; a process and status managing section which manages management information including information on statuses of the plurality of processors and priorities of processes being executed by the plurality of processors; a processing processor selecting section which selects one of the processors which is executing the process with a lowest priority on the basis of the management information managed by the process and status managing section; and an interrupt controlling section which transmits a requested interrupt process to the selected processor as an interrupt process request, wherein the processing processor selecting section selects the one of the processors, which is executing the process with the lowest priority, irrespective of whether each of the requested interrupt process and the processes being executed by the processors is a task process which is handled according to a predetermined schedule or an interrupt process which is handled independently of the schedule.

7 Claims, 10 Drawing Sheets

FOREIGN PATENT DOCUMENTS

| | | |
|---|---|---|
| JP | A-06-324996 | 11/1994 |
| JP | A-2005-004562 | 1/2005 |
| JP | A-2006-243864 | 9/2006 |
| JP | A-2006-259968 | 9/2006 |
| JP | A-2007-280023 | 10/2007 |

* cited by examiner

PROCESSOR AND INTERRUPT CONTROLLING METHOD

The entire disclosure of Japanese Patent Application No. 2006-304,798, filed Nov. 10, 2006, is expressly incorporated by reference herein.

BACKGROUND

1. Field of the Invention

The present invention relates to a processor and an interrupt controlling method capable of processing a plurality of tasks or handling a plurality of interrupt processes in parallel.

2. Description of the Related Art

These days, a multiprocessor system and a multithreaded processor (hereinafter generically referred to as "multiprocessors") capable of processing, in parallel, a plurality of tasks or threads (uniformly referred to as tasks in this specification) by including a plurality of processors are being used in embedded devices and the like. In a conventional mobile device, processing has been performed by a single processor. An increase in the sophistication of mobile devices has complicated processing performed therein, which has become difficult for a single processor to perform.

If a multiprocessor performs processing, it needs to respond to occurrence of an interrupt process differently from a single processor. For example, there are conceivable a method in which one of a plurality of processors is designated in advance as a processor which is to perform processing according to the type of interrupt and a method in which an interrupt signal is input to all of a plurality of processors, and arbitration among the processors is performed.

Note that techniques pertaining to a method for performing arbitration between processors in a multiprocessor to assign an interrupt process are described in JP-A-6-324996 (hereinafter referred to as Patent Document 1) and JP-A-2005-4562 (hereinafter referred to as Patent Document 2).

Each of the techniques described in Patent Documents 1 and 2 is a technique in which an interrupt controller is provided for each of processors in a multiprocessor, and arbitration between the interrupt controllers is performed upon occurrence of an interrupt request.

However, since an interrupt controller is provided for each processor in the technique described in Patent Document 1, pieces of hardware required become larger, and wiring becomes complicated. Accordingly, the technique is not suitable for embedded devices. If one of the plurality of processors is designated in advance as a processor which is to perform processing according to the type of interrupt as described above, a situation may arise in which an interrupt process is not executed even with a processor in a non-operating state. This may decrease processing efficiency.

It is difficult to efficiently handle processes with high priorities including an interrupt process in an environment with limited hardware resources, such as one in which a multiprocessor applied to an embedded device is placed. If interrupt control is performed mainly by software to suppress an increase in the size of hardware, it is disadvantageous in that the time required to select a processor and a delay in processing caused by an interrupt request are longer than when interrupt control is performed by hardware.

The conventional technique described in Patent Document 2 has been made with a focus on the fact that the priorities of interrupt processes are generally high. For this reason, requested interrupt processes are all accepted to prevent a request for an interrupt process from being made to wait by a process already being executed. Each of the accepted interrupt processes is assigned to one of the plurality of processors which is executing a process with the lowest priority.

In a multiprocessor, a processor may be disabled for interrupts to prevent a task being executed by the processor from being interrupted by another task or interrupt. However, according to the technique in Patent Document 2, since interrupt requests are all accepted, the meaning of disabling interrupts in a multiprocessor may be lost to affect operation.

Additionally, since the difference in priority between an interrupt process and a process being executed is not taken into consideration, there arises the problem of that a process being executed is interrupted by an interrupt even if the process has a particularly high priority.

SUMMARY

The present invention has been made in consideration of the above-described points, and has as its object to provide a processor and an interrupt controlling method capable of taking into consideration the status (e.g., whether interrupts are disabled) of a processor by collectively managing the priorities of a process performed as a task and a process performed upon request for an interrupt and of appropriately executing the task process and interrupt process in descending order of priority.

In order to solve the above-described problems, a processor of the present invention comprises a plurality of processors, a process and status managing section which manages management information including information on statuses of the plurality of processors and priorities of processes being executed by the plurality of processors, a processing processor selecting section which selects one of the processors which is executing the process with a lowest priority on the basis of the management information managed by the process and status managing section, and an interrupt controlling section which transmits a requested interrupt process to the selected processor as an interrupt process request. The processing processor selecting section selects the one of the processors, which is executing the process with the lowest priority, irrespective of whether each of the requested interrupt process and the processes being executed by the processors is a task process which is handled according to a predetermined schedule or an interrupt process which is handled independently of the schedule.

According to this invention, it is possible to provide a processor capable of taking statuses of processors into consideration and appropriately selecting a processor which is to execute a requested interrupt process.

It is also possible to select one of processors which is executing a process with a lowest priority, irrespective of whether each of a process requested by an interrupt and processes being executed by the processors is a task process or interrupt process. Accordingly, it is possible to provide a processor capable of appropriately executing a process performed as a task and a process performed upon request for an interrupt in descending order of priority by collectively managing priorities of the task process and interrupt process.

In the processor of the present invention, if the management information managed by the process and status managing section includes information indicating that at least one of the plurality of processors is in an interrupt-disabled state in which execution of an interrupt process is disabled, the processing processor selecting section excludes the at least one processor in the interrupt-disabled state from selection as a processor which is to execute the interrupt process.

According to this invention, it is possible to provide a processor capable of taking into consideration whether processors are in the interrupt-disabled state and appropriately selecting a processor which is to execute a requested interrupt process.

The processor of the present invention further comprises an interrupt suspending section which, if it is determined as a result of comparing a priority of the process being executed by the one of the plurality of processors selected by the processing processor selecting section with a priority of the requested interrupt process that the priority of the requested interrupt process is lower, suspends execution of the requested interrupt process until the processor is ready to execute.

According to this invention, it is possible to prevent a process with a higher priority from being interrupted if there is no appropriate processor to accept an interrupt and appropriately execute a process.

In the processor of the present invention, the interrupt suspending section includes a ready queue which manages each of a task process and an interrupt process, which is assigned to any one of the processors, on the basis of an ordinal position determined according to a priority of the process without distinction between the task process and the interrupt process, and the interrupt controlling section assigns the task process and interrupt process to the processors in an order according to the ready queue.

According to this invention, it is possible to appropriately execute suspended processes in descending order of priority.

In the processor of the present invention, the ready queue manages an interrupt process which is suspended from execution by the interrupt suspending section after being assigned to any one of the processors by the interrupt controlling section.

According to this invention, it is possible to achieve coordination between an interrupt process which is placed into a suspended state after being assigned to any one of processors and other processes and assign the process to an appropriate processor.

In the processor of the present invention, the interrupt controlling section keeps nested an interrupt process which is suspended from execution by the interrupt suspending section until a predetermined one of the plurality of processors is ready to execute.

According to this invention, it is possible to simplify a process of resuming a process which is placed into a suspended state after being assigned to any one of processors.

An interrupt controlling method of the present invention is an interrupt controlling method comprising an interrupt controlling step of selecting a processor which is to execute a requested interrupt process on the basis of management information including information on statuses of a plurality of processors and priorities of processes being executed by the plurality of processors, wherein the interrupt controlling step includes selecting one of the processors which is executing the process with a lowest priority, irrespective of whether each of the requested interrupt process and the processes being executed by the processors is a task process which is handled according to a predetermined schedule or an interrupt process which is handled independently of the schedule and assigning the interrupt process to the selected processor.

According to this invention, it is possible to select one of processors which is executing a process with a lowest priority, irrespective of whether each of a process requested by an interrupt and processes being executed by the processors is a task process or interrupt process. Accordingly, it is possible to provide an interrupt controlling method capable of appropriately executing a process performed as a task and a process performed upon request for an interrupt in descending order of priority by collectively managing priorities of the task process and interrupt process.

DETAILED DESCRIPTION OF THE PREFERRED EMBODIMENTS

A processor according to an embodiment of the present invention will be described below.

Figure 1:
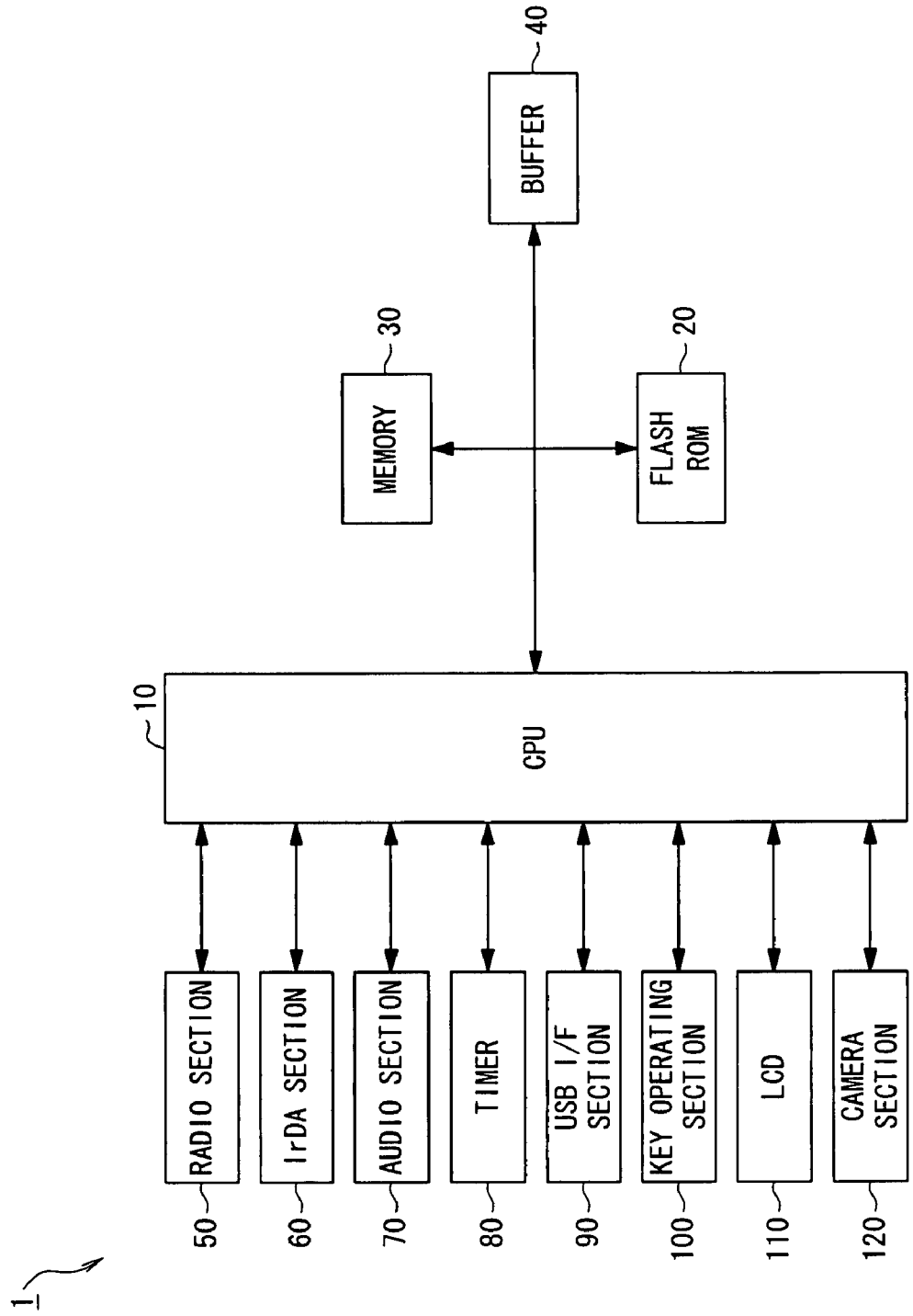
FIG. 1 is a block diagram showing the functional configuration of a mobile phone to which a processor according to an embodiment of the present invention is applied.

FIG. 1 is a block diagram showing the functional configuration of a mobile phone 1 to which a processor according to the present invention is applied. The processor of this embodiment is a multiprocessor which includes a plurality of processors (unit processors) and constitutes a CPU 10 shown in FIG. 1. Note that hereinafter, the term processor, when used alone, will refer to the multiprocessor of this embodiment including the plurality of unit processors.

In FIG. 1, the mobile phone 1 is configured to include the CPU (central processing unit) 10, a flash ROM 20, a memory 30, a buffer 40, a radio section 50, an IrDA (Infrared Data Association) section 60, an audio section 70, a timer 80, a USB (Universal Serial Bus) interface section 90, a key operating section 100, an LCD (liquid crystal display) 110, and a camera section 120. The CPU 10, flash ROM 20, memory 30, and buffer 40 are connected to one another through a bus. The radio section 50, IrDA section 60, audio section 70, timer 80, USB interface section 90, key operating section 100, LCD 110, and camera section 120 are directly connected to the CPU 10.

The CPU 10 controls the entire mobile phone 1 while processing a plurality of tasks in parallel. The CPU 10 reads out and executes an operating system (OS) and various types of application programs stored in the flash ROM 20 in response to various types of command signals input from the key operating section 100. If an interrupt signal requesting an interrupt process is input from a peripheral chip such as the radio section 50, audio section 70, or camera section 120 to the CPU 10, the CPU 10 executes an interrupt handler corresponding to the interrupt signal.

The CPU 10 processes tasks created by the applications in parallel. If an interrupt signal is input from a peripheral chip, the CPU 10 executes a program corresponding to an interrupt by executing an interrupt handler.

As described above, a task process is a process which is handled according to a predetermined schedule (task schedule). A requested interrupt process is handled by an interrupt handler independently of the task schedule.

Note that in this embodiment, an interrupt requested from the CPU 10 by a peripheral chip will be referred to as an external interrupt and be distinguished from an internal interrupt, which refers to an interrupt caused by, e.g., task switching performed by any of the applications. Also note that the term interrupt, when used alone, will refer to an external interrupt. Since an internal interrupt process requested by any of the applications is executed as a task which is managed by a task scheduler of the OS, it can invoke a service call provided by the OS. An external interrupt process is a process which is not managed by the task scheduler (non-task process).

The CPU 10 stores various types of processing results in the flash ROM 20 or memory 30. The internal configuration of the CPU 10 will now be described.

The flash ROM 20 shown in FIG. 1 stores the operating system program and the various types of application programs to be executed in the mobile phone 1. The memory 30 is composed of a semiconductor memory such as a DRAM (dynamic random access memory), an SRAM (static random access memory), or an SDRAM (synchronous DRAM). The memory 30 forms a work area when the CPU 10 executes processing and stores the result of the processing.

The buffer 40 is a buffer which temporarily holds data input from the outside to the mobile phone 1 or data generated in the mobile phone 1. The radio section 50 performs radio communication between the mobile phone 1 and a base station of a mobile phone system. For example, if the radio section 50 receives a signal indicating an incoming call to the mobile phone 1 from the base station, it outputs an interrupt signal to the CPU 10 to notify the CPU 10 of receipt of the incoming call signal. If a signal ordering call origination is input from the CPU 10, the radio section 50 sends a signal indicating a request for call origination to the base station.

The IrDA section 60 is an interface which performs communication based on the IrDA standard. If the IrDA section 60 receives a radio signal based on the IrDA standard from the outside, it outputs an interrupt signal to the CPU 10 to notify the CPU 10 of receipt of the IrDA signal. The audio section 70 processes a voice signal which is input to or output from the mobile phone 1 and performs processing such as input and output of voice using a microphone and a speaker during a call or playback of music or the like.

The timer 80 measures time on the basis of a clock signal of the mobile phone 1 and outputs an interrupt signal to the CPU 10 at regular time intervals such as 1-ms intervals. The USB interface section 90 is an interface for performing USB-based communication. The USB interface section 90 outputs an interrupt signal to the CPU 10 if, e.g., a USB cable is connected to the mobile phone 1 or it receives a signal from a USB cable.

The key operating section 100 includes various types of keys for inputting commands to the mobile phone 1. If any of these keys is pressed, the key operating section 100 outputs an interrupt signal to the CPU 10. The LCD 110 is a display device which displays a predetermined screen in accordance with an instruction to draw a character, image, or the like input from the CPU 10. The camera section 120 includes an image sensor such as a CCD (charge coupled device) sensor or CMOS (complementary metal oxide semiconductor) sensor. The camera section 120 outputs an interrupt signal to the CPU 10 when it takes an image.

Figure 2:
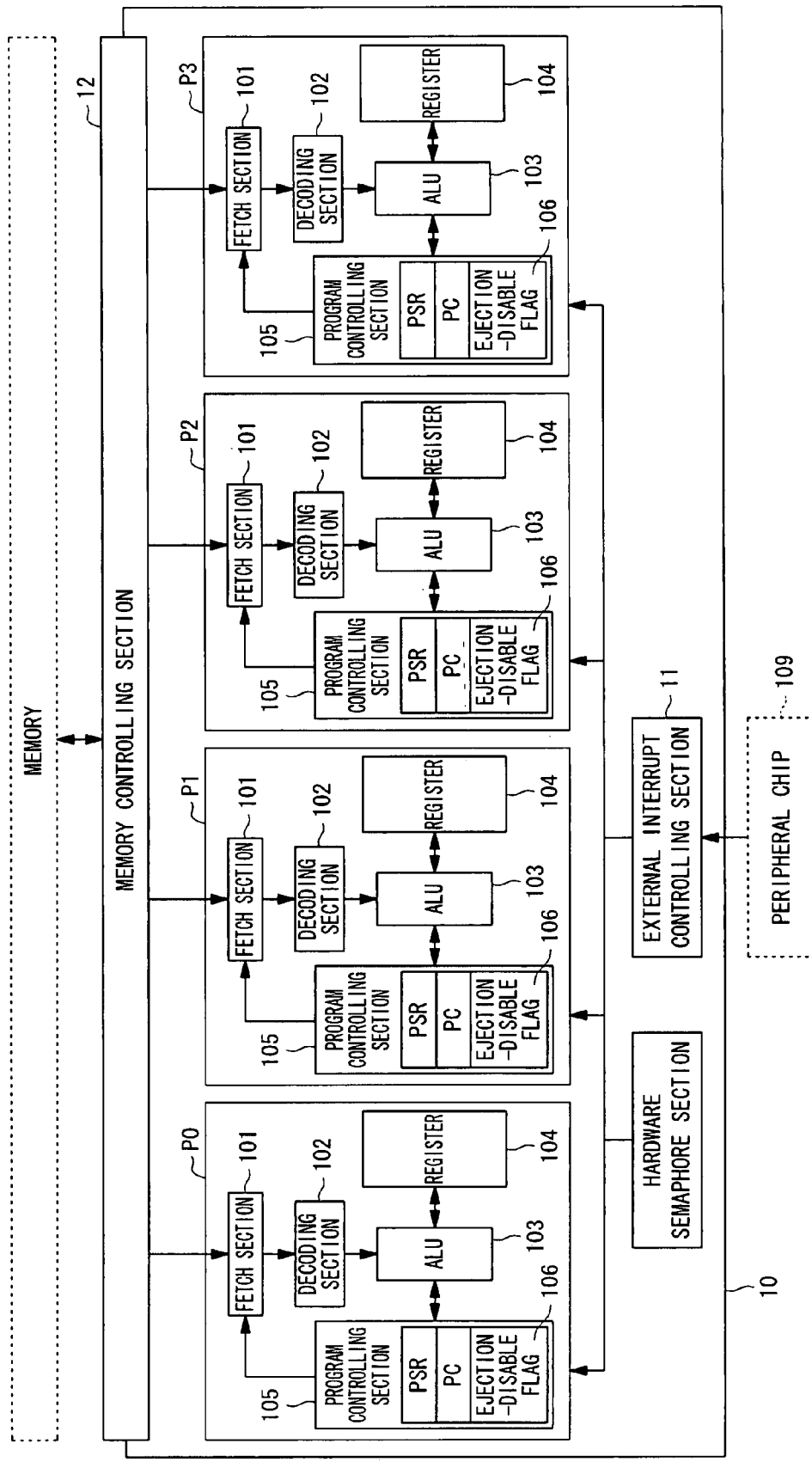
FIG. 2 is a block diagram showing the internal configuration of the processor according to the embodiment of the present invention, which is configured as a multiprocessor.

FIG. 2 is a block diagram showing the internal configuration of the CPU 10, i.e., the processor of this embodiment configured as a multiprocessor. The CPU 10 is a multiprocessor including a plurality of processor sections (unit processors) P0 to P3 which execute tasks or interrupt processes and is configured to include the unit processors P0 to P3, an external interrupt controlling section 11, and a memory controlling section 12. Note that a peripheral chip 109 shown in FIG. 2 includes functional sections, such as the radio section 50, IrDA section 60, and audio section 70 shown in FIG. 1, which are directly connected to the CPU 10, and each of a plurality of peripheral chips which are shown as the peripheral chip 109 is any one of the functional sections.

The unit processors P0 to P3 are each a unit processor capable of processing tasks in parallel. If an interrupt signal is generated in the peripheral chip 109, one of the unit processors which is selected by the external interrupt controlling section 11 (to be described later) executes an interrupt process. Note that since the unit processors P0 to P3 have the same internal configuration, the internal configuration of the unit processor P0 as a representative of the unit processors will be described.

The unit processor P0 is configured to include a fetch section 101, a decoding section 102, an ALU (arithmetic logical unit) 103, a register 104, and a program controlling section 105. The fetch section 101 reads out an instruction code from a memory address indicated by a program counter of the program controlling section 105 (to be described later) and outputs the instruction code to the decoding section 102.

The decoding section 102 decodes the instruction code input from the fetch section 101 and outputs a decoding result (the details of an instruction, the addresses of a source register and destination register, and the like) to the ALU 103. The ALU 103 performs a predetermined operation according to the decoding result input from the decoding section 102 and writes the result of the operation to the register 104 or outputs the address of a branch destination which is the result of executing a branch instruction or the like to the program controlling section 105.

The register 104 is composed of a group of registers which store data read out from the memory 30 by a load instruction and data which is the result of an operation performed by the ALU 103. The program controlling section 105 controls the entire unit processor P0 and is configured to include a status register (PSR) storing the status (e.g., whether interrupts are enabled and whether an overflow is occurring in the unit processor P0) of the unit processor P0 and the program counter (PC) storing a memory address into which an instruction to be executed by the unit processor P0 next. The program controlling section 105 changes the value of the PSR to an interrupt process-disabled state when the unit processor P0 shifts to an interrupt process. The program controlling section 105 changes the value of the program counter to the address of a branch destination if a branch instruction is executed.

If a task being executed outputs a request for a hardware semaphore, the program controlling section 105 first receives the result of requesting the hardware semaphore and sets a flag indicating that acquisition of the hardware semaphore is successful or a flag indicating that acquisition of the hardware semaphore is unsuccessful. If the flag indicating that acquisition of the hardware semaphore is unsuccessful (a flag indicating that shifting to the OS is rejected) is set, the unit processor temporarily stops trying to acquire the hardware semaphore and exits a standby state.

The program controlling section 105 further includes an ejection-disable flag 106. The ejection-disable flag 106 is a mechanism for disabling a task from being ejected from the specified unit processor due to task switching or an external interrupt which has occurred in the unit processor. The program controlling section 105 disables a task currently in the unit processor from being replaced with another task by setting the ejection-disable flag 106 to 1. A state in which a unit processor is disabled for task ejection will also be referred to as a locked state hereinafter.

The ejection-disable flags 106 are intended to individually disable the plurality of unit processors P0 to P3 for interrupts.

Figure 3:
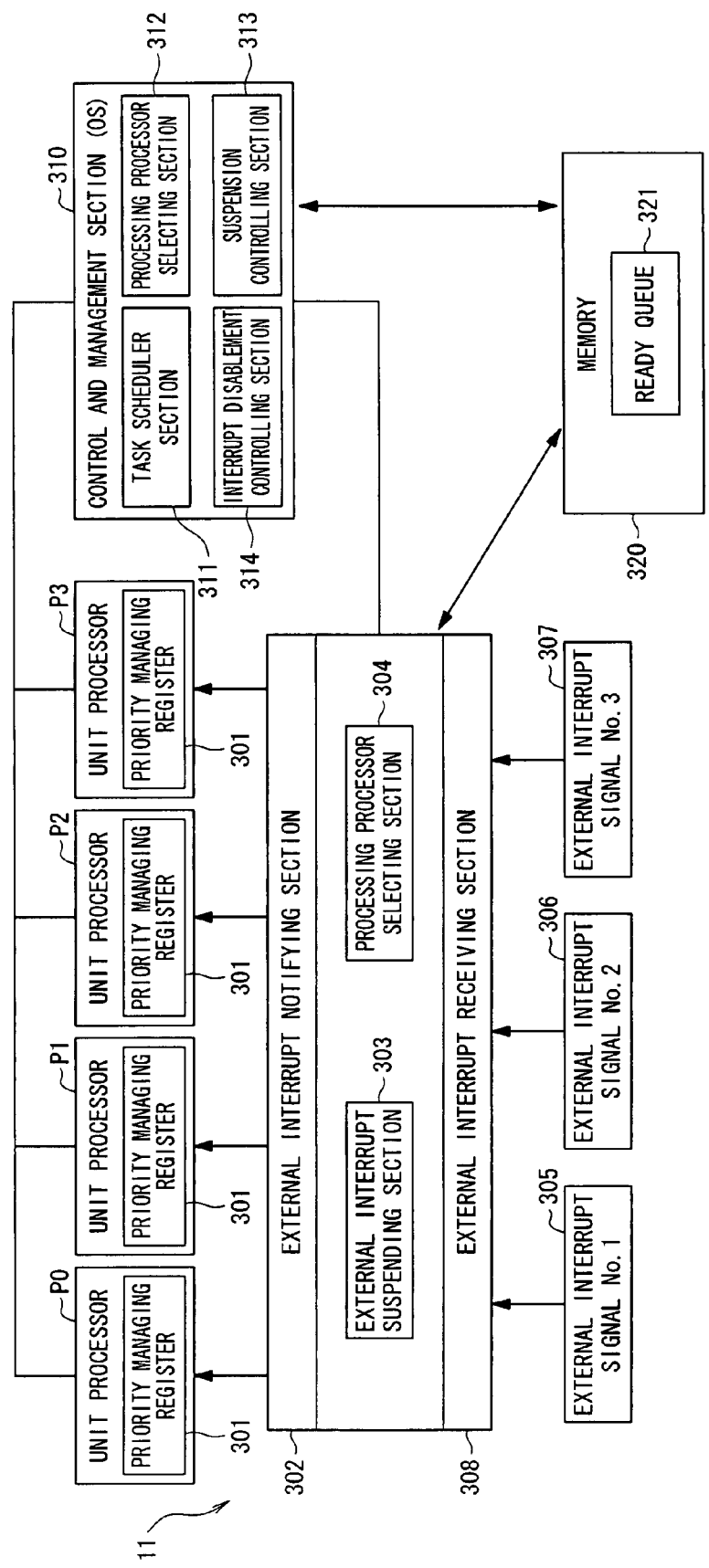
FIG. 3 is a diagram showing, in more detail, a part pertaining to the present invention of the configuration shown in FIG. 2.

FIG. 3 is a diagram showing, in more detail, a part pertaining to the present invention of the configuration shown in FIG. 2.

In the processor of this embodiment, the unit processors P0 to P3 each include a priority managing register 301 which manages management information including information on the process execution status of the unit processor itself and the priority of a process being executed by the unit processors P0 to P3. The management information managed by the priority managing register 301 will be described later.

FIG. 3 shows external devices collectively shown as the peripheral chip 109 in FIG. 2, a device 305 which outputs an external interrupt signal No.1, a device 306 which outputs an external interrupt signal No.2, and a device 307 which outputs an external interrupt signal No.3. An interrupt process requested from the unit processors P0 to P3 is an external interrupt process requested by any of the devices 305 to 307.

The external interrupt controlling section 11 selects one of the unit processors which is executing a process with the lowest priority, irrespective of whether each of a requested interrupt process and processes being executed by the unit processors P0 to P3 is a task process or interrupt process. The external interrupt controlling section 11 transmits an interrupt process request to the selected unit processor.

More specifically, the external interrupt controlling section 11 includes an external interrupt receiving section 308 which receives the No.1 to No.3 external interrupt signals output from the devices 305, 306, and 307. The external interrupt controlling section 11 also includes a processing processor selecting section 304 which, if any of the No.1 to No.3 external interrupt signals is received, detects an interrupt request indicated by the external interrupt signal and selects a unit processor which is to execute an interrupt process and an external interrupt suspending section 303 which suspends a requested interrupt process until any of the unit processors is ready to execute if the priority of the interrupt process is lower than that of a process being executed by a selected one of the unit processors.

The processing processor selecting section 304 selects one of the unit processors P0 to P3 which is executing a task or external interrupt process with the lowest priority on the basis of the pieces of management information of the unit processors.

The external interrupt controlling section 11 further includes an external interrupt notifying section 302. The external interrupt notifying section 302 transmits, as an interrupt process request, a requested interrupt process to one of the unit processors which is selected by the processing processor selecting section 304.

The processor of this embodiment accepts a request for an external interrupt while causing the unit processors P0 to P3 to execute tasks managed by the OS, and the OS functions as a control and management section 310. The function of managing tasks of the OS will also be referred to as a task scheduler. A task is processed according to a task schedule. An interrupt process requested from each unit processor as an interrupt is handled not by the OS but by an interrupt handler which operates on the external interrupt controlling section 11.

Assignment of an interrupt process by the external interrupt controlling section 11 will be described in more detail. The control and management section 310 includes, as components for managing only tasks, a task scheduler section 311, a processing processor selecting section 312 which selects a unit processor which is to execute a task in accordance with the task scheduler section 311, an interrupt disablement controlling section 314 which prevents a task being executed by any of the unit processors from being ejected from the unit processor, and a suspension controlling section 313 which manages a task waiting to be executed.

As described above, the external interrupt controlling section 11 includes the external interrupt suspending section 303 and processing processor selecting section 304. The processing processor selecting section 304 detects the statuses of the unit processors P0 to P3 from the priority managing registers 301. The status of each of the unit processors P0 to P3 includes whether the unit processor is disabled for interrupts and the priority of a task or external interrupt process being executed by the unit processors P0 to P3.

If a requested interrupt is assigned to any of the unit processors, the external interrupt controlling section 11 invokes an interrupt handler instead of a task being executed by the unit processor. Upon invocation of the interrupt handler, the processing processor selecting section 304 compares the priority of a task or external interrupt process being executed by the unit processor selected in advance with that of a requested interrupt process. If it is determined that the priority of the requested interrupt process is lower, the processing processor selecting section 304 selects the unit processor as a unit processor to which the interrupt process can be assigned. Since the unit processor is currently unable to execute the interrupt process, the external interrupt suspending section 303 suspends this interrupt process.

The interrupt handler causes the unit processor to execute the interrupt process and ends upon completion of the interrupt process. After the end of the interrupt handler, the OS operates to resume processing tasks.

This embodiment has a configuration in which tasks and interrupt processes are managed independently of each other, as described above, and includes a memory 320 which can be accessed by both the control and management section 310 and external interrupt controlling section 11. The control and management section 310 records a task suspended by the suspension controlling section 313 in the memory 320 together with information indicating execution priority. The external interrupt controlling section 11 compares the priority of an interrupt process suspended by the external interrupt suspending section 303 with those of recorded tasks.

The external interrupt controlling section 11 assigns, to the interrupt process, an ordinal position posterior to that of one of the tasks which has a priority higher than that of the interrupt process and anterior to that of one of the tasks which has a lower priority, records the interrupt process in a place where the tasks are recorded and forms a ready queue 321.

The ready queue thus formed manages a task process or interrupt process to be assigned to any of the unit processors P0 to P3 on the basis of an ordinal position which is determined according to its priority, irrespective of whether the process is a task process or interrupt process. The processing processor selecting section 304 selects one of the unit processors for processes in the order according to the ready queue, and the external interrupt notifying section 302 transmits an interrupt process request to the selected unit processor.

In the above-described configuration, the priority managing registers 301 function as a process and status managing section of this embodiment. The external interrupt controlling section 11 including the processing processor selecting section 304 functions as the process and status managing section, a selecting section, and an interrupt controlling section of this embodiment. The external interrupt suspending section 303, suspension controlling section 313, and ready queue 321 function as a suspending section of this embodiment.

The more specific configuration of the priority managing registers 301 will now be described. The unit processors P0 to P3 are each provided with the priority managing register 301. The unit processors P0 to P3 have the same configuration. For this reason, the priority managing register 301 of the unit processor P0 will be described, and descriptions of the unit processors P1 to P3 will be omitted.

The priority managing register 301 will be concretely described below on the basis of the management information managed by the priority managing register 301. The priority managing register 301 can be configured using a register which can hold 7 bits of data as the management information. In this example, the bits indicate the pieces of information below.

Bit 6: This bit indicates whether the processor is disabled for interrupts (1: disabled, 0: not disabled).

Bit 5: This bit indicates the status of the unit processor (1: RUN, 0: HALT).

Bit 4: This bit indicates whether the process being executed is an interrupt handler (1) or task process (0) if the processor is in a RUN state.

Bits 3-0: These bits indicate the priority of the interrupt handler (interrupt process) or task process being executed if the processor is in a RUN state.

Note that in the above-described example, the priority of an interrupt process or task process becomes lower with a decrease in its value.

In this embodiment, the priority managing register 301 is added to the existing group of registers in each of the unit processors P0 to P3. Note that this embodiment, of course, is not limited to this, and the priority managing register 301 may be configured as a register for exclusive use. The priority managing registers 301 allow the external interrupt controlling section 11 to easily compare the priorities of processes being executed by the unit processors, P0 to P3 and select one of the unit processors which is executing the process with the lowest priority.

Updating of the contents of each priority managing register 301 described above is triggered by the following events:
  task switching in the processor caused by generation of a task with a priority higher than those of processes being executed;
  interruption of a task or interrupt process being executed by a request for an interrupt process with a priority higher than those of processes being executed;
  shifting of a task being executed by any of the unit processors P0 to P3 to a standby state;
  completion of an interrupt process being executed by any of the unit processors P0 to P3; and
  disabling of any of the unit processors P0 to P3 for interrupts or re-enabling of any of the unit processors P0 to P3 for interrupts.

If an interrupt is requested from the processor, the external interrupt controlling section 11 compares the priority of the requested interrupt with the contents of the priority managing registers 301. The external interrupt controlling section 11 selects one of the unit processors which is executing a task or interrupt process (hereinafter also simply referred to as a process) with a priority lower than that of a requested interrupt process and assigns the generated interrupt process to the unit processor.

If there are a plurality of processes with priorities lower than that of the requested interrupt process, the external interrupt controlling section 11 selects one of the unit processors which is executing the process with the lowest priority in this embodiment.

If the pieces of information managed by the priority managing registers 301 include information indicating that at least one of the unit processors P0 to P3 is disabled for interrupts, the external interrupt controlling section 11 excludes the unit processor disabled for interrupts from selection. In the above-described example, if bit 6 of the priority managing register 301 of any of the unit processors P0 to P3 is set to "1", the external interrupt controlling section 11 determines that the unit processor is disabled for interrupts.

For example, if bit 6 for the unit processor P0 of the unit processors P0 to P3 is set to "1", the external interrupt controlling section 11 determines that the unit processor P0 is disabled for interrupts and selects any of the unit processors except the unit processor P0, i.e., the unit processors P1 to P3 as a unit processor which is to execute a requested interrupt process.

With the priority managing registers 301, it is possible to collectively manage the statuses of the unit processors P0 to P3 and the priorities of processes being executed by the unit processors P0 to P3, irrespective of whether each of the processes is a task process or interrupt process. The control and management section 310 and external interrupt controlling section 11 can easily determine the status of each of the unit processors P0 to P3 and the priority of a task process or interrupt process being executed by the unit processor by referring to the priority managing register 301.

For this reason, the control and management section 310 and external interrupt controlling section 11 can handle an external interrupt in consideration of the status (e.g., whether interrupts are disabled) of each unit processor. It is also possible to easily compare the priorities of processes being executed with that of a requested interrupt process and appropriately execute processes in descending order of priority.

According to this embodiment, the efficacy of disabling each unit processor for interrupts is not lost. Also, an interrupt process being executed by any of the unit processors is not interrupted by an external interrupt process with a lower priority.

If none of the unit processors is executing a process with a priority lower than that of a requested interrupt process, the external interrupt controlling section 11 accesses the memory 320 and adds the interrupt process to the ready queue 321. The interrupt process added to the ready queue 321 is suspended until any of the unit processors is ready.

If a task being executed by any of the unit processors is interrupted by an interrupt process, the interrupted task is returned to the ready queue 321 and is suspended until the next execution. A unit processor which is to execute the task the next time is not limited to the unit processor interrupted during execution of the task, and any other unit processor may execute the task.

If an interrupt process being executed by any of the unit processors is interrupted by another interrupt process, the interrupted interrupt process may be returned to the ready queue 321 and be suspended until the next execution, like a task. In this case, a unit processor which is to execute the interrupt process the next time is not limited to the unit processor interrupted during execution of the interrupt process, and any other unit processor may execute the task.

Figure 4:
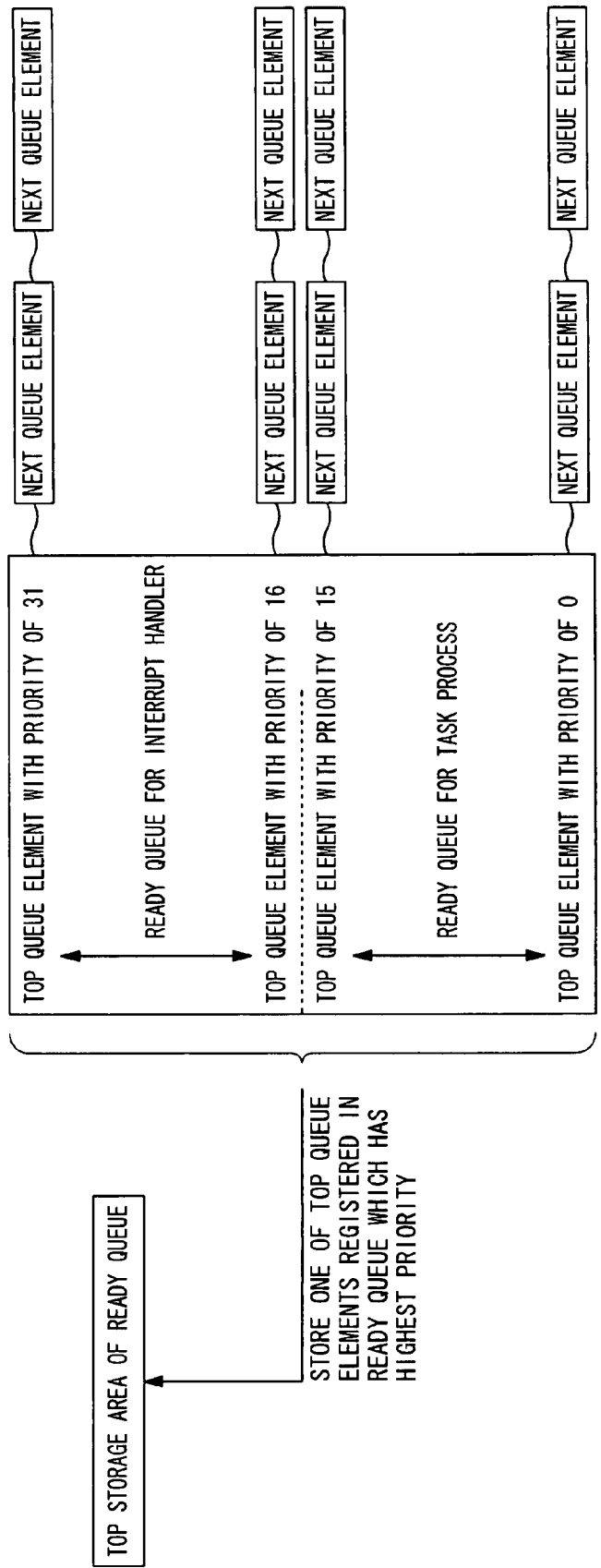
FIG. 4 is a diagram for explaining a ready queue shown in FIG. 3.

FIG. 4 is a diagram illustrating the ready queue 321. The ready queue 321 shown in FIG. 4 is configured to manage priorities, ranging from as low as 0 to as high as 31. A task process or interrupt process is stored in an area corresponding to its priority of the memory 320. If there are a plurality of processes corresponding to a priority, the plurality of processes are stored in a predetermined sequence. Each process whose ordinal position in the sequence is posterior to another is shown as a next queue element in FIG. 4.

In the ready queue 321 shown in FIG. 4, tasks are stored in areas for priorities of 0 to 15 while interrupt processes are stored in areas for priorities of 16 to 31. The ready queue 321 is configured in this manner because interrupt processes generally have priorities higher than those of tasks. However, in an exceptional case where there is a task with a priority higher than that of an interrupt process, an area for storing a task may be provided among the areas, in which interrupt processes are stored, of the ready queue 321 in this embodiment.

One of processes stored in the ready queue 321 which has the highest priority is stored in a top storage area (not shown) of the memory 320. If any of the unit processors ends its process, the process stored in the top storage area is assigned to the unit processor and is executed.

Note that this embodiment may be configured such that an interrupt process which is assigned to any of the unit processors P0 to P3 and then is interrupted and suspended to wait for the next execution is returned to the ready queue 321.

However, this embodiment is not limited to the above-described configuration, in which an interrupted process is returned to the ready queue 321. More specifically, in this embodiment, it is also possible to keep nested an interrupt process which is assigned to any of the unit processors P0 to P3 and then is interrupted and suspended to wait for the next execution until the one previously assigned the interrupt process of the plurality of unit processors P0 to P3 is ready to execute.

Nesting of an interrupt process makes it possible to simplify a process of resuming an interrupted interrupt process in this embodiment.

A control method used by the processor of this embodiment described above is shown as the flow charts in FIGS. 5 to 10. Note that the term process in the flow charts, when used alone, may refer to either an external interrupt process or a task.

Figure 5:
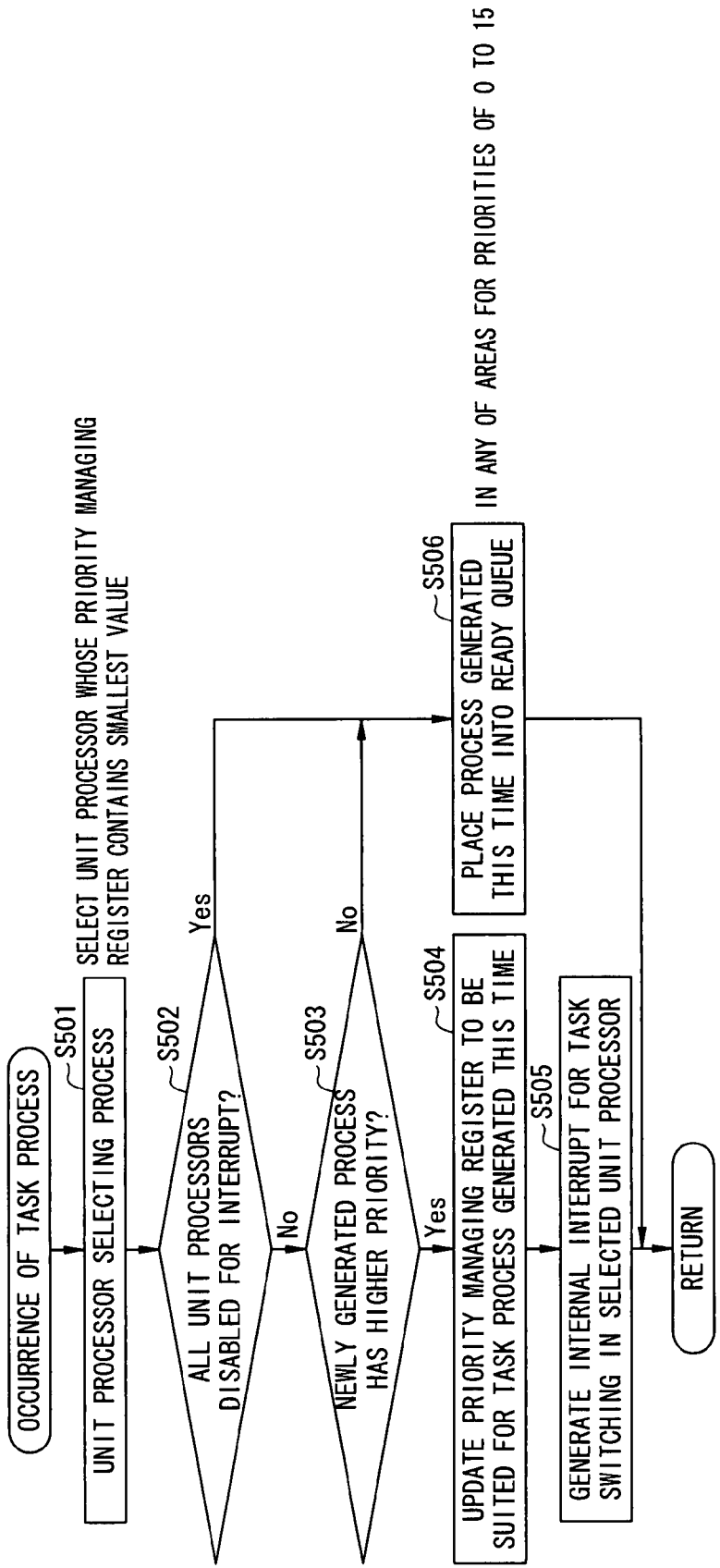
FIG. 5 is a flow chart for explaining the operation of a control and management section when a task interrupt according to the embodiment of the present invention occurs.

The flow chart shown in FIG. 5 is a flow chart for explaining the operation of the control and management section 310 when a task interrupt occurs while processes are being executed. If a request for an interrupt requesting a task process occurs, the control and management section 310 starts a process of selecting a unit processor which is to handle the interrupt (S501). The control and management section 310 determines whether all of the unit processors P0 to P3 are currently disabled for interrupts while referring to the priority managing registers 301 of the unit processors (S502).

If the result of the determination in step S502 shows that the unit processors P0 to P3 are disabled for interrupts (YES in S502), the task requested by the interrupt is stored in an area corresponding to its priority of the ready queue 321 (S506'). As a result, the task is placed into the ready queue 321 and is suspended until any of the unit processors is ready to execute.

If it is determined in step S502 that any of the unit processors P0 to P3 is not disabled for interrupts (NO in S502), the control and management section 310 determines whether there is any unit processor executing a process with a priority lower than that of the generated task among the unit processor (s) not disabled for interrupts (S503). If there is any unit processor executing a process with a lower priority (YES in S503), the control and management section 310 updates the priority managing register(s) 301 of the found unit processor (s) and prepares for task switching (S504).

The control and management section 310 then refers to the priority managing register(s) 301 and selects one of the unit processor(s), in which a value indicating a priority is the smallest. Note that if the result of referring to the priority managing registers 301 shows that there is any unit processor in a HALT state, the priority for the unit processor(s) in a HALT state is determined to be lower than those for all the other unit processors in a RUN state. The control and management section 310 causes the selected unit processor to handle the generated task interrupt (S505).

Figure 6:
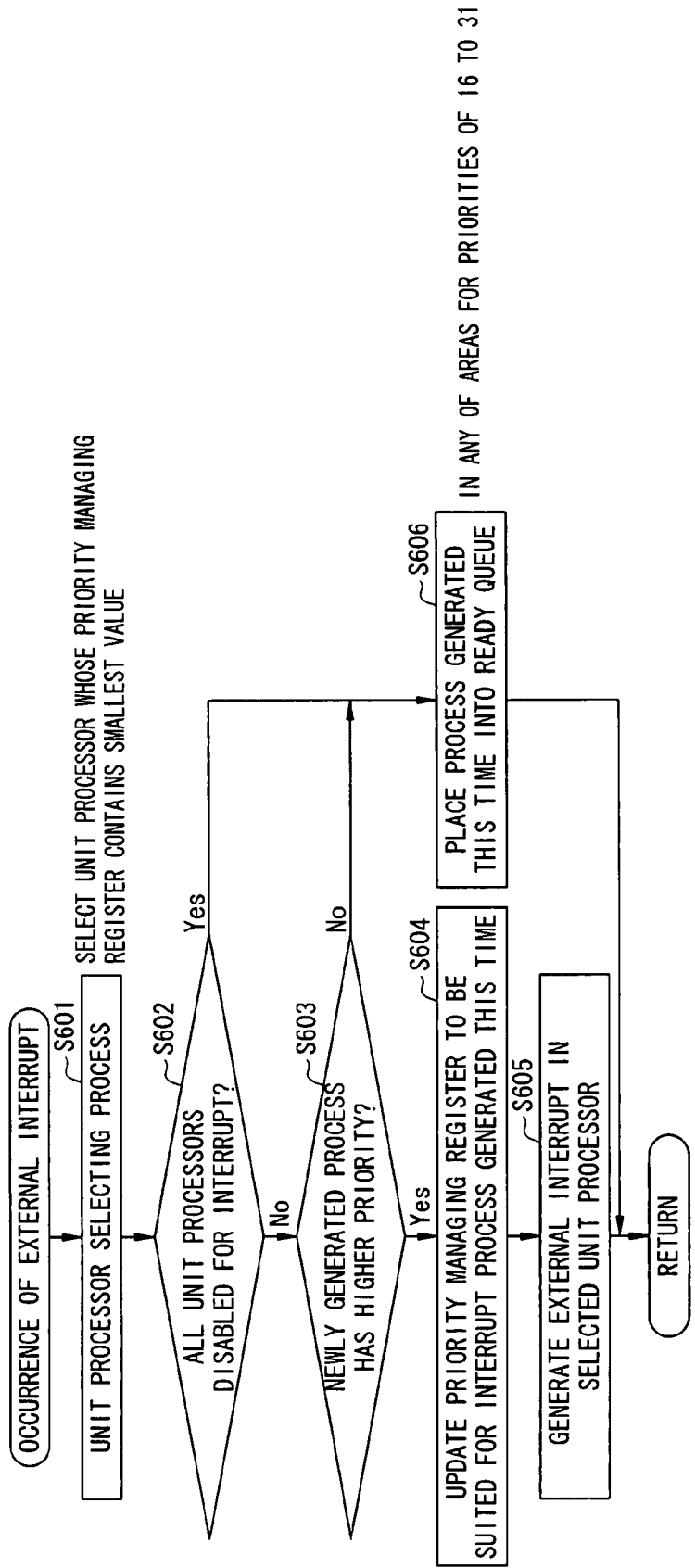
FIG. 6 is a flow chart for explaining the operation of an external interrupt controlling section when an external interrupt according to the embodiment of the present invention occurs.

FIG. 6 is a flow chart for explaining the operation of the external interrupt controlling section 11 when an external interrupt occurs. If the external interrupt signal output from any of the devices 305 to 307 is input, the external interrupt controlling section 11 starts a process of selecting a unit processor which is to handle an interrupt (S601). Note that in this process, the external interrupt controlling section 11 refers to the priority managing registers 301 and selects one of the unit processors, in which a value indicating the priority of a process being executed is the smallest (the priority is the lowest).

The external interrupt controlling section 11 determines whether all of the unit processors P0 to P3 are currently disabled for interrupts while referring to the priority managing registers 301 of the unit processors (S602).

If the result of the determination in step S602 shows that the unit processors P0 to P3 are disabled for interrupts (YES in S602), the external interrupt controlling section 11 stores a generated interrupt process in an area corresponding to its priority of the ready queue 321 (S606). As a result, the interrupt process is placed into the ready queue 321 and is suspended until any of the unit processors is ready to execute.

If it is determined in step S602 that any of the unit processors P0 to P3 that is a candidate for the unit processor to execute the interrupt process is not disabled for interrupts (NO in S602), the external interrupt controlling section 11 determines whether the priority(ies) of process(es) being executed by the found unit processor(s) is (are) lower than that of the generated interrupt process (S603). If the priority (ies) of the process(es) being executed by the unit processor (s) serving as the candidate(s) is (are) lower (YES in S603), the external interrupt controlling section 11 updates the priority managing register(s) 301 of the unit processor(s) and prepares for the interrupt process (S604).

The external interrupt controlling section 11 then selects one of the unit processor(s) serving as the candidate(s) in which the priority of the process being executed is lower. The control and management section 310 causes the selected unit processor to execute the generated external interrupt process (S605).

Note that in the above-described process, if the result of referring to the priority managing registers 301 shows that there is any unit processor in a HALT state, the priority for the unit processor(s) in a HALT state is determined to be lower than those for all the other unit processors in a RUN state.

Figure 7:
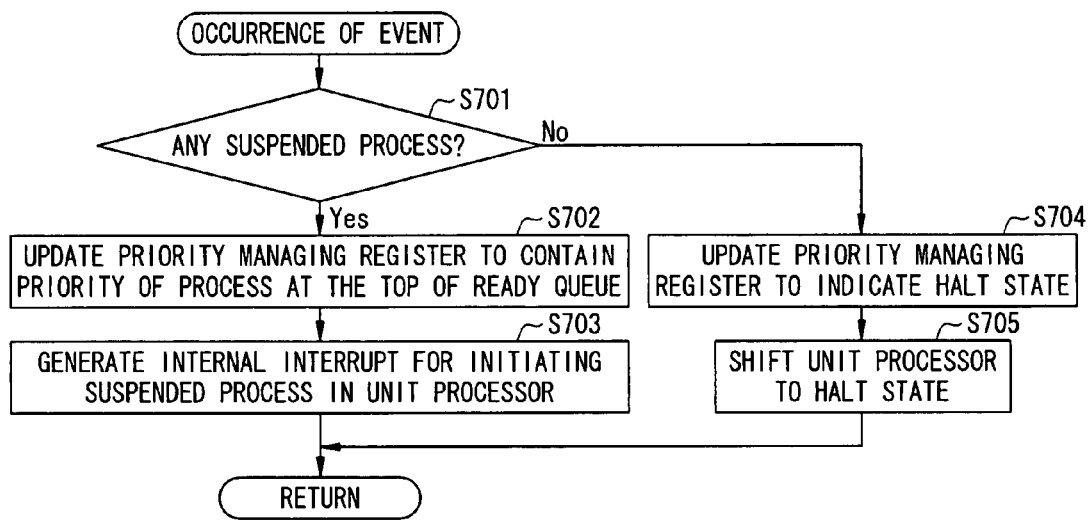
FIG. 7 is a flow chart for explaining a method for bringing a task queued by a method shown in FIG. 5 out of a suspended state.

FIG. 7 is a flow chart for explaining a method for bringing a task queued by the method shown in FIG. 5 out of a suspended state. In the event that a task being executed by any of the unit processors P0 to P3 ends or shifts to a standby state, the control and management section 310 determines whether there is any task in a suspended state in the ready queue 321 (S701). If there is no task in a suspended state (NO in S701), the control and management section 310 updates bit 5 of the priority managing register 301 of the unit processor, in which the event has occurred, to be set to "0" and sets information to indicate that the unit processor is in a HALT state (S704). The control and management section 310 shifts the unit processor to a HALT state (S705).

On the other hand, if there is any task in a suspended state (YES in S701), the control and management section 310 records the priority of a task at the top of the ready queue 321 using bits 3 to 0 of the priority managing register 301 of the unit processor, in which the event has occurred (S702).

The control and management section 310 then generates an internal interrupt related to the task, whose priority is recorded, in the unit processor (S703).

Figure 8:
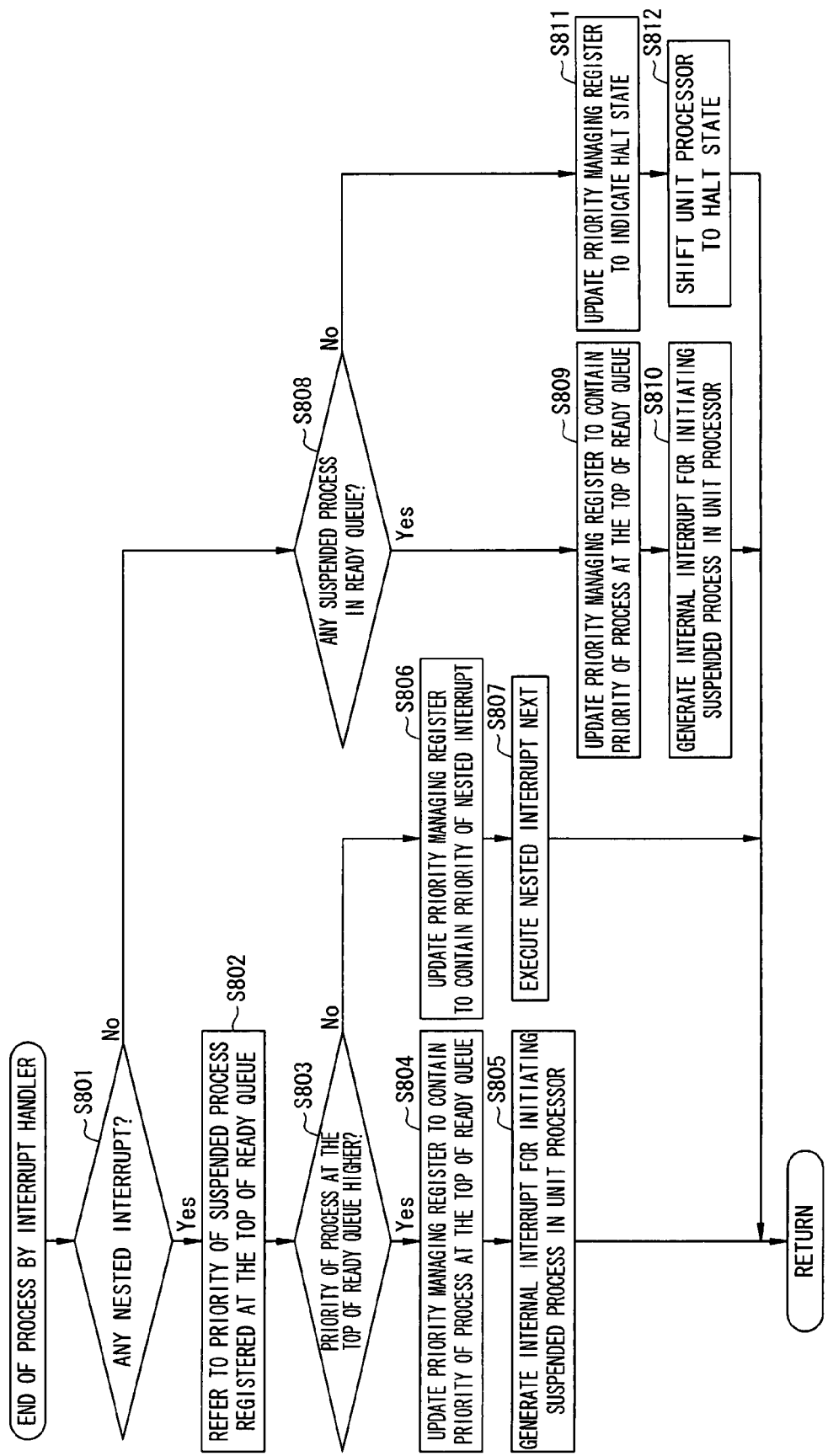
FIG. 8 is a flow chart for explaining a method for bringing a task and an external interrupt respectively queued by methods shown in FIGS. 5 and 6 out of a suspended state.

FIG. 8 is a flow chart for explaining a method for bringing a task and an external interrupt respectively queued by the methods shown in FIGS. 5 and 6 out of a suspended state. If an interrupt process being executed by any of the unit processors P0 to P3 ends, the external interrupt controlling section 11 determines whether there is any nested interrupt process kept waiting for the end of the interrupt process (S801).

If there is a nested interrupt process (YES in S801), the external interrupt controlling section 11 refers to the priority of a process at the top of the ready queue 321 (S802). The external interrupt controlling section 11 then compares the priority of the nested interrupt process with that of the process at the top of the ready queue 321 (S803).

The comparison of the priority of the interrupt process with that of the process in the ready queue is performed in the manner below. Since the nested interrupt process is an external interrupt process, if the process at the top of the ready queue is a task, basically, the nested process is executed. If an external interrupt process with a priority higher than that of the nested process is registered at the top of the ready queue, the process registered at the top of the ready queue is initiated. Note that initiation is performed by generating an internal interrupt in a corresponding one itself of the unit processors.

If the result of the comparison in step S803 shows that the priority of the process at the top of the ready queue 321 is lower than that of the nested process (NO in S803), the external interrupt controlling section 11 sets the priority of the nested interrupt process in the priority managing register 301 of the unit processor, which has ended the interrupt process (S806).

The external interrupt controlling section 11 then causes the unit processor to execute the nested interrupt process (S807).

If it is determined in step S803 that the priority of the interrupt process at the top of the ready queue 321 is higher than that of the nested process (NO in S803), the external interrupt controlling section 11 sets the priority of the interrupt process at the top of the ready queue 321 in the priority managing register 301 of the unit processor, which has ended the interrupt process (S804).

The external interrupt controlling section 11 then generates an internal interrupt for causing the unit processor to initiate the process in a suspended state in the ready queue 321 (S805).

On the other hand, if it is determined in step S801 that there is no nested interrupt process (NO in S801), the external interrupt controlling section 11 determines whether there is any interrupt process in a suspended state in the ready queue 321 (S808). If there is no interrupt process in a suspended state (NO in S801), the external interrupt controlling section 11 updates bit 5 of the priority managing register 301 of the unit processor, which has ended the interrupt process, to be set to "0" and sets information to indicate that the unit processor is in a HALT state (S811). The external interrupt controlling section 11 then shifts the unit processor to a HALT state (S812).

If there is any interrupt process in a suspended state in the ready queue 321 (YES in S808), the external interrupt controlling section 11 sets the priority of a process at the top of the ready queue 321 in the priority managing register 301 of the unit processor, which has ended the interrupt process (S809). The external interrupt controlling section 11 then generates an internal interrupt for causing the unit processor to initiate the process in a suspended state in the ready queue 321 (S810).

Figure 9:
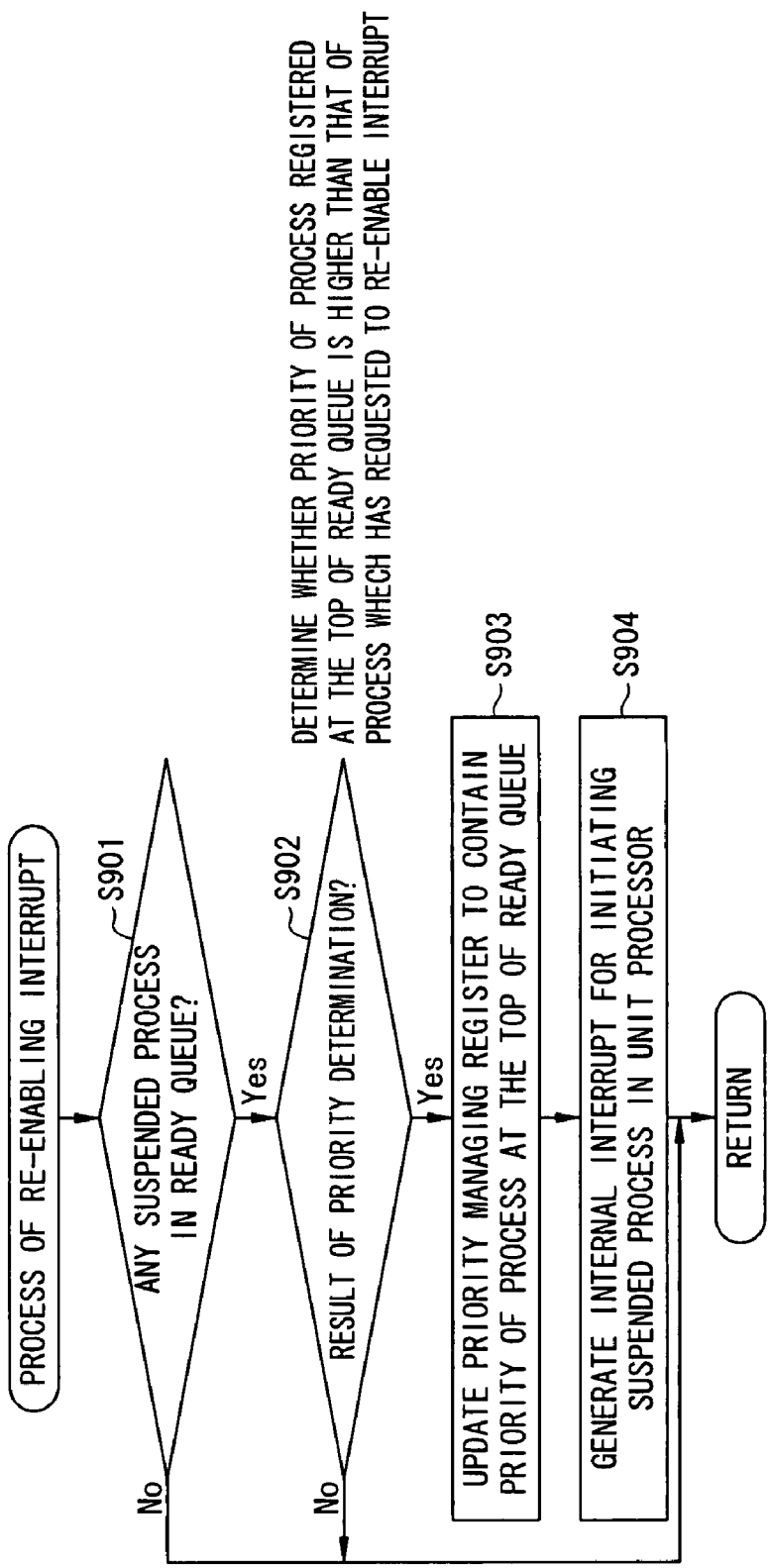
FIG. 9 is a flow chart for explaining a process for the control and management section according to the embodiment of the present invention to re-enable a unit processor for interrupts.

FIG. 9 is a flow chart for explaining a process for the control and management section 310 in a case of re-enabling a unit processor for interrupts. The control and management section 310 starts a process of re-enabling interrupts. The control and management section 310 first determines whether there is any process in a suspended state in the ready queue 321 (S901).

If there is any process in a suspended state (YES in S901), the control and management section 310 compares the priority of a process at the top of the ready queue 321 with that of a task which has been re-enabled for interrupting (S902).

The flow chart shown in FIG. 9 represents a case where a task has been re-enabled for interrupting. Accordingly, if an external interrupt or a task with a higher priority is registered in the ready queue, basically, the right to be executed shifts. On the other hand, if an external interrupt or a task with a higher priority is not registered, a task which has been re-enabled for interrupting continues to be executed.

If the priority of the process at the top of the ready queue 321 is higher than that of the task, which has been re-enabled for interrupting (YES in S902), the control and management section 310 sets the priority of the process at the top of the ready queue 321 in the priority managing register 301 of one of the unit processors which is re-enabled for interrupting (S903).

The control and management section 310 then makes an request for an internal interrupt to the unit processor which is re-enabled for interrupting and causes the unit processor to execute the process at the top of the ready queue 321 (S904). If it is determined that the priority of the process at the top of the ready queue 321 is lower than that of the task being executed by the unit processor which is re-enabled for interrupting (NO in S902), the task, which has been re-enabled for interrupting, continues to be executed.

Figure 10:
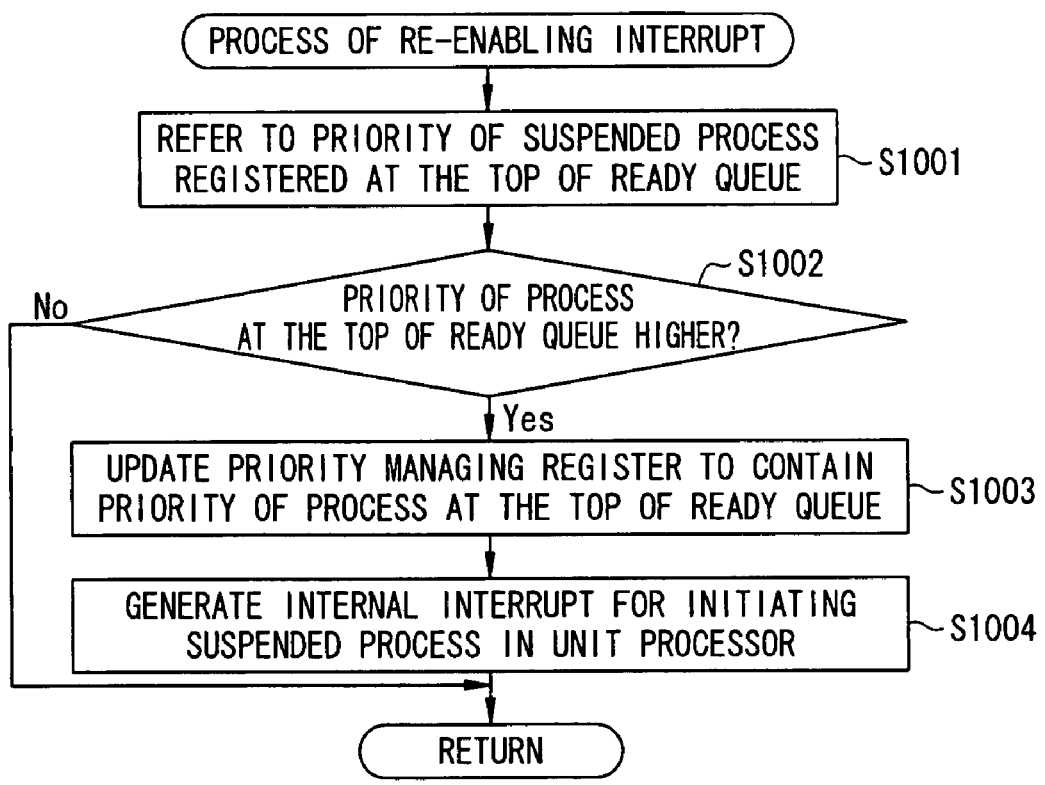
FIG. 10 is a flow chart for explaining a method for the external interrupt controlling section according to the embodiment of the present invention to re-enable a unit processor for interrupts.

FIG. 10 is a flow chart for explaining a method for the external interrupt controlling section 11 to re-enable a unit processor for interrupts. The external interrupt controlling section 11 refers to the priority of an interrupt process in a suspended state at the top of the ready queue 321 (S1001). The external interrupt controlling section 11 then compares the referred-to priority of the interrupt process with that of a process being executed by one of the unit processors which is requested to be re-enabled for interrupts (S1002).

If the result of the comparison shows that the priority of the interrupt process in a suspended state is higher than that of the process being executed by the unit processor requested to be re-enabled for interrupts (YES in S1002), the external interrupt controlling section 11 sets the priority of the process at the top of the ready queue 321 in the priority managing register 301 of the unit processor requested to be re-enabled for interrupts (S1003).

The external interrupt controlling section 11 then generates an internal interrupt for causing the unit processor requested to be re-enabled for interrupts to initiate the process suspended in the ready queue 321 (S1004).

If it is determined that the priority of the process at the top of the ready queue 321 is lower than that of the process being executed by the unit processor requested to be re-enabled for interrupts (NO in S1002), the process being executed by the unit processor continues to be executed.

The processor and interrupt controlling method of this embodiment described above can take into consideration the status (e.g., whether interrupts are disabled) of each unit processor and appropriately select a unit processor which is to execute a requested interrupt process.

Each of the unit processors P0 to P3 manages its status (e.g., whether interrupts are disabled) and the priority of a process which it is executing (irrespective of whether it is executing a task or interrupt process) using the priority managing register 301. Accordingly, the external interrupt controlling section 11 and control and management section 310 can select one of the unit processors P0 to P3 which is executing a process whose priority is the lowest among processes being executed by the unit processors and is lower than that of a process requested by an interrupt, irrespective of whether each of the process requested by the interrupt and the processes being executed by the unit processors is a task process or interrupt process.

For this reason, this embodiment can provide a processor and an interrupt controlling method capable of appropriately executing a process performed as a task and a process performed upon request for an interrupt in descending order of priority by collectively managing the priorities of the task process and interrupt process.

Since this embodiment described above can retrieve the priorities of processes being executed by the unit processors P0 to P3 at high speed, it is effective in a system with a high incidence of interrupts. This embodiment can be realized by adding a register to each of the unit processors P0 to P3, and thus it is possible to flexibly respond to an increase or decrease in the number of unit processors in the multiprocessor.

What is claimed is:

1. A processor comprising:
a plurality of processors;
a process and status managing section which manages management information including information on statuses of the plurality of processors and priorities of processes being executed by the plurality of processors;
a processing processor selecting section which selects one of the processors which is executing the process with a lowest priority on the basis of the management information managed by the process and status managing section; and
an interrupt controlling section which transmits a requested interrupt process to the selected processor as an interrupt process request,
wherein each of the plurality of processors includes a priority managing register for managing its status as to whether interrupts are disabled and a priority of a process which it is executing irrespective of whether it is executing a task or interrupt process, and the processing processor selecting section selects the one of the processors, which is executing the process with the lowest priority, after determining that all of the plurality of processors are disabled for interrupts, the requested interrupt process is stored in an area of a ready queue based on a priority associated with the requested interrupt process, or after determining that at least one of the processors are not disabled for interrupts, then determining that at least one of the plurality of processors not disabled for interrupts is executing a process with a lower priority than a priority of the interrupt process, irrespective of whether each of the requested interrupt process and the processes being executed by the processors is a task process which is handled according to a predetermined schedule or an interrupt process which is handled independently of the schedule.

2. The processor according to claim 1, wherein if the management information managed by the process and status managing section includes information indicating that at least one of the plurality of processors is in an interrupt-disabled state in which execution of an interrupt process is disabled, the processing processor selecting section excludes the processor in the interrupt-disabled state from selection as a processor which is to execute the interrupt process.

3. The processor according to claim 1, further comprising an interrupt suspending section which, if it is determined as a result of comparing a priority of the process being executed by the one of the plurality of processors selected by the processing processor selecting section with a priority of the requested interrupt process that the priority of the requested interrupt process is lower, suspends execution of the requested interrupt process until the processor is ready to execute.

4. The processor according to claim 3, wherein
the interrupt suspending section includes a ready queue which manages each of a task process and an interrupt process, which is assigned to any one of the processors, on the basis of an ordinal position determined according to a priority of the process, and
the interrupt controlling section assigns the task process and interrupt process to the processors in an order according to the ready queue.

5. The processor according to claim 3, wherein the ready queue manages an interrupt process which is suspended from execution by the interrupt suspending section after being assigned to any one of the processors by the interrupt controlling section.

6. The processor according to claim 3, wherein the interrupt controlling section keeps nested an interrupt process which is suspended from execution by the interrupt suspending section after being assigned to any one of the processors until the processor assigned the interrupt process is ready to execute.

7. An interrupt controlling method comprising:
an interrupt controlling step of selecting a processor which is to execute a requested interrupt process on the basis of management information including information on statuses included in a plurality of processors and priorities of processes being executed by the plurality of processors,
wherein each of the plurality of processors manages its status as to whether interrupts are disabled and a priority of a process which it is executing irrespective of whether it is executing a task or interrupt process using a priority managing register, and the interrupt controlling step includes selecting one of the processors which is executing the process with a lowest priority, after determining that all of the plurality of processors are disabled for interrupts, the requested interrupt process is stored in an area of a ready queue based on a priority associated with the requested interrupt process, or after determining that at least one of the processors are not disabled for interrupts, then determining that at least one of the plurality of processors not disabled for interrupts is executing a process with a lower priority than a priority of the interrupt process, irrespective of whether each of the requested interrupt process and the processes being executed by the processors is a task process which is handled according to a predetermined schedule or an interrupt process which is handled independently of the schedule and assigning the interrupt process to the selected processor.

* * * * *

UNITED STATES PATENT AND TRADEMARK OFFICE
CERTIFICATE OF CORRECTION

| | |
|---|---|
| PATENT NO. | : 7,853,743 B2 |
| APPLICATION NO. | : 11/979341 |
| DATED | : December 14, 2010 |
| INVENTOR(S) | : Akinari Todoroki et al. |

It is certified that error appears in the above-identified patent and that said Letters Patent is hereby corrected as shown below:

(73)  Seiko Epson Corporation, Tokyo (JP);
  National University Corporation, Nagoya-shi (JP)

Please replace with

(73)  Seiko Epson Corporation, Tokyo (JP);
  National University Corporation Nagoya University, Nagoya-shi (JP)

Signed and Sealed this
Second Day of August, 2011

David J. Kappos
*Director of the United States Patent and Trademark Office*

UNITED STATES PATENT AND TRADEMARK OFFICE
CERTIFICATE OF CORRECTION

PATENT NO. : 7,853,743 B2  
APPLICATION NO. : 11/979341  
DATED : December 14, 2010  
INVENTOR(S) : Akinari Todoroki et al.

Page 1 of 1

It is certified that error appears in the above-identified patent and that said Letters Patent is hereby corrected as shown below:

Title Page, Item (73) Assignee
"Seiko Epson Corporation, Tokyo (JP);
National University Corporation, Nagoya-shi (JP)"

should read

-- Seiko Epson Corporation, Tokyo (JP);
National University Corporation Nagoya University, Nagoya-shi (JP) --

This certificate supersedes the Certificate of Correction issued August 2, 2011.

Signed and Sealed this
Twenty-third Day of August, 2011

David J. Kappos
*Director of the United States Patent and Trademark Office*